US010329090B2

(12) United States Patent
Wang et al.

(10) Patent No.: US 10,329,090 B2
(45) Date of Patent: Jun. 25, 2019

(54) ROBOT CONTROL SYSTEM FOR MINIMIZING A NUMBER OF RACKS USED FOR ORDER PICKING

(71) Applicant: SAP SE, Walldorf (DE)

(72) Inventors: Yonghui Wang, Shanghai (CN); Yingjie Han, Shanghai (CN); Xutan Zhao, Shanghai (CN); Zhengxiang Zhang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/669,150

(22) Filed: Aug. 4, 2017

(65) Prior Publication Data

US 2019/0039830 A1    Feb. 7, 2019

(51) Int. Cl.
B65G 1/137    (2006.01)
(52) U.S. Cl.
CPC ................. B65G 1/1378 (2013.01)
(58) Field of Classification Search
USPC ........................................ 700/216
See application file for complete search history.

(56) References Cited

U.S. PATENT DOCUMENTS

| | | | | |
|---|---|---|---|---|
| 8,311,902 B2* | 11/2012 | Mountz | ............... | G06Q 10/087 700/213 |
| 8,538,692 B2* | 9/2013 | Wurman | ............... | G06Q 10/08 340/988 |
| 8,965,562 B1* | 2/2015 | Wurman | ............... | G06Q 10/087 235/385 |
| 9,111,251 B1* | 8/2015 | Brazeau | ............. | G06Q 10/087 |
| 9,389,609 B1* | 7/2016 | Mountz | ........... | G05B 19/41895 |
| 9,452,883 B1* | 9/2016 | Wurman | ............... | G06Q 10/087 |
| 9,487,356 B1* | 11/2016 | Aggarwal | ............. | B64C 39/024 |
| 10,029,851 B1* | 7/2018 | Durham | ............... | B65G 1/1373 |
| 2007/0021864 A1* | 1/2007 | Mountz | ............... | G06Q 10/087 700/216 |
| 2009/0185884 A1* | 7/2009 | Wurman | ............... | B65G 1/1378 414/270 |
| 2016/0229631 A1* | 8/2016 | Kimura | ............... | G05D 1/0291 |

* cited by examiner

*Primary Examiner* — Kyle O Logan
(74) *Attorney, Agent, or Firm* — Klarquist Sparkman, LLP

(57) ABSTRACT

Techniques are provided for controlling an order-picking, rack-transporting robot. More specifically, the robot is controlled to select a minimized number of movable racks storing ordered products identified in one or more orders for product deliveries, while still ensuring that all ordered products are included.

20 Claims, 11 Drawing Sheets

ROBOT CONTROL SYSTEM FOR MINIMIZING A NUMBER OF RACKS USED FOR ORDER PICKING

TECHNICAL FIELD

This description relates to robot control systems for order-picking robots.

BACKGROUND

Robots are often used to reduce or eliminate human labor, and provide increased speed, efficiency, and profitability. For example, a warehouse environment may be stocked with a large number of items for sale, spread over a potentially large area of the warehouse. As orders for items are received from customers, the ordered items are retrieved from their respective locations within the warehouse, for packing and shipping to the ordering customers. This process may be time-consuming and labor-intensive.

Robots may be used to retrieve the ordered items in an efficient and cost-effective manner. For example, mobile robots may be equipped to traverse the warehouse environment, locate at least one rack that is storing at least one ordered item, and transport the rack(s) and item(s) to a designated location. At the designated location, the gathered items may be packed into containers corresponding to individual orders, and shipped to the ordering customers.

In practice, however, it may be difficult to realize the desired advantages of deploying robots in these and similar environments. For example, if the robots transport an unnecessarily large number of racks for packing of associated items, a total time to completion may be unacceptably long, and time and resources may be wasted.

SUMMARY

In the present description, robots are controlled in a manner that minimizes a number of racks visited during order picking. In particular, algorithms are used to explore a solution space of racks to be visited, and to find a minimized number of racks.

For example, a local optimum solution may be determined. For example, a greedy algorithm may be utilized, in which a local optimum solution is determined that may approximate the global optimum solution, but within a timeframe that is generally much shorter than the timeframe needed to find the global optimum solution.

The details of one or more implementations are set forth in the accompanying drawings and the description below. Other features will be apparent from the description and drawings, and from the claims.

DETAILED DESCRIPTION

Figure 1:
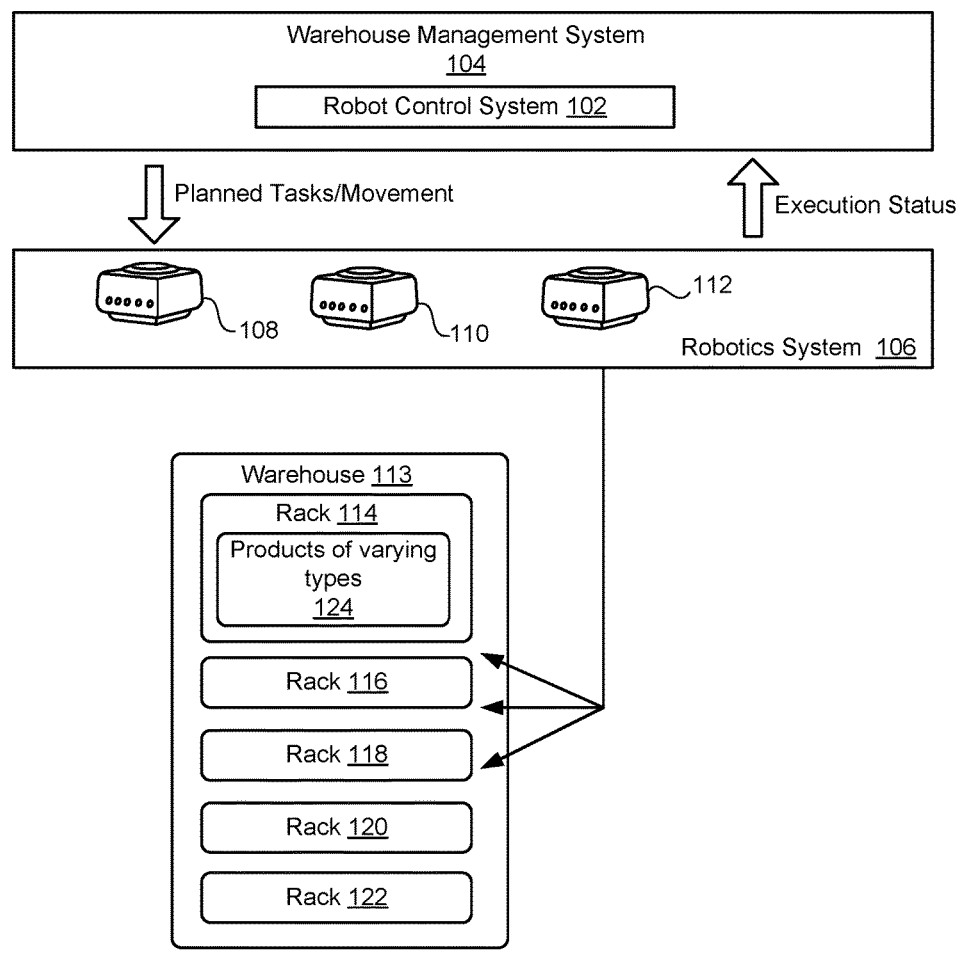
FIG. 1 is a block diagram of a system for minimizing a number of racks used for order picking by an order-picking robot.

FIG. 1 is a block diagram of a system 100 for minimizing a number of racks used for order picking by an order-picking robot. In the example of FIG. 1, a robot control system 102 is illustrated in the context of a warehouse management system (WMS) 104. The robot control system 102 is configured to control a robotics system 106, which includes example robots 108, 110, and 112.

As shown, the robots 108, 110, 112 are deployed within a warehouse 113 that includes a plurality of racks 114, 116, 118, 120, and 122. As explained in more detail, below, each of the racks 114-122 is assumed to store various types of products. In the simplified example of FIG. 1, for the sake of conciseness, only the rack 114 is explicitly illustrated as containing products of varying types 124.

In practice, the robot control system 102 receives orders placed by one or more customers, where the orders specify multiple products to be retrieved from within the warehouse 113, for delivery thereof to the ordering customers. The robot control system 102 is further configured to control the robots 108, 110, 112 to retrieve the ordered products from among the various types of products stored within the warehouse 113, while minimizing a number of the racks 114-122 that are required to be visited by the robots 108, 110, 112. By minimizing the number of racks required to be visited for each order or set of orders, the robot control system 102 may, for example, satisfy customer orders quickly and efficiently, and in a cost-effective manner.

In the present description, it will be appreciated that the warehouse 113 may generally represent virtually any physical location(s) that is accessible by the robots 108, 110, 112. For example, the warehouse may include a building(s), a field, a lot, a hangar, or any structure or area designated for storage of specified products.

Of course, the warehouse 113 may be designed and implemented in a manner that reflects the products being stored within the warehouse 113. For example, the various racks 114-122 may be sized and structured to contain or hold desired products of compatible/corresponding sizes and shapes. Accordingly, the racks 114-122 should be generally understood to represent or include any shelves, bins, vats, pallets, or other containers or surfaces that are suitable for storage of corresponding products.

In the example of FIG. 1, it is presumed that the racks 114-122 are also compatible with, and suitable for movement by, any one of the robots 108, 110, 112 of the robotics system 106. That is, the robots 108, 110, 112 may represent virtually any mechanical, mobile device, movements and actions of which are at least partially controllable by local (e.g., self-contained) computer hardware and software of each robot 108, 110, 112, including suitable processors and memories. Consequently, the robots 108, 110, 112 may also be referred to as rack-transporting robots. As referenced below, movements and actions of the robots 108, 110, 112 also may be at least partially controlled remotely, e.g., by transmission of commands sent by the robot control system 102.

The robots 108, 110, 112 may be made mobile by any known or future technique(s), including, e.g., wheels, tracks, or legs, which may be individual to each robot, or shareable among multiple robots. As referenced, it is assumed that each of the racks 114-122 is transportable or otherwise movable, and that each robot 108, 110, 112 has one or more features for transporting or moving one or more of the racks 114-122. For example, each robot 108, 110, 112 may include one or more surfaces on which one or more of the racks 114-122 may rest during robot movements. The robots 108, 110, 112 may include one or more containers, shelves, or other structure(s) that are specifically designed to be compatible with the various racks 114-122, e.g., to facilitate and enable the selection, loading, and transporting of each selected rack.

Further, each robot 108, 110, 112 may be configured to move into a loading position with respect to a desired rack. Loading may include, e.g., driving under, or adjacent to, a rack, to thereby engage with the rack and prepare the rack for movement. Loading may include moving a selected robot into position with (e.g., under) a desired rack, and then engaging an operation of the robot and/or the rack to complete the loading process. For example, the rack 114 may be loaded by, as appropriate, a raising or lowering and/or release of the rack 114 using corresponding computer hardware/software. Additionally, or alternatively, the robots 108, 110, 112 may include an extendable robot arm having, e.g., a claw or other grasping mechanism, which may be used to load the rack 114.

It will be appreciated that the above examples are intended merely as non-limiting instances of robots, racks, and interactions therebetween. Accordingly, many other additional or alternative examples of known or future robots and racks may be used in the system 100 of FIG. 1.

In all such examples, as referenced above, the system 100 of FIG. 1 is configured to reduce and minimize operations and movements of the robots 108, 110, 112, as well as associated movements and uses of the racks 114-122. For example, such minimizations may conserve costs, increase customer satisfaction, and generally represent an efficient and effective use of resources within the warehouse 113.

For example, in one scenario, it may occur that an order is received from a customer that includes four products of four product types, such as a computer, keyboard, monitor, and mouse. If all four of the products of the four product types are stored using the rack 114 (i.e., included within product of varying types 124), then the robot 108 would simply need to retrieve the rack 114 for transporting to a packing location, for packing and delivery of the four products. On the other hand, if one of each of the four products is stored using one of each of the remaining racks 116, 118, 120, 122, then the same order could be fulfilled by retrieving the four racks 116, 118, 120, 122 for transporting to the packing location, for packing and delivery of the four products.

Of course, the latter approach would be considerably less efficient than the former, since four racks would be transported instead of one. Further, in the second/latter scenario, four of the racks would be temporarily occupied and unavailable for other order fulfillments, rather than just the single rack 114 in the first/former example.

In practice, the warehouse 113 may be very large, and the number of racks (and products stored thereon) also may be extremely large. Additionally, it may occur that large orders are received (e.g., orders specifying a large number and/or variety of products), or that the system 100 is designed to fulfill multiple orders at the same time (which also may lead to a need to retrieve a large number and/or variety of products). Consequently, with such a large solution space for selecting appropriate racks, conventional systems may control robots in a manner that results in the types of inefficiencies referenced above.

Some techniques for minimizing a number of required racks, as referenced indirectly above, include mixing and correlating products of varying types on a single rack or nearby racks. For example, as described in the example above, the rack 114 may include a mixing of products of varying types 124, such as the computer, keyboard, monitor, and mouse referenced above. If the racks 114-122 were restricted to a single product type, then any combination of products of varying product types would require a corresponding number of racks, which would be inefficient. Somewhat similarly, if product types were uncorrelated on a single rack, such as a computer and a comb, then the likelihood of receiving an order specifying both products would be very low, and the potential benefits of having racks with mixed product types would be reduced.

Thus, mixing generally refers to combing products of varying types on a single rack, while correlating generally refers to using various correlation techniques to ensure that the mixed product types on each rack are similar (e.g., tend to be purchased together in a single order, or by the same consumer, or category of consumer). Various techniques for optimizing a type and degree of mixing and/or correlating product types may be used. For purposes of the present description, it is assumed that some determined type and degree of mixing/correlating has been performed with respect to the layouts and contents of the racks 114-122, and that the robot control system 102 is configured to direct the robots 108, 110, 112, to pick racks in a manner that minimizes a number of racks required to be transported and used.

Figure 2:
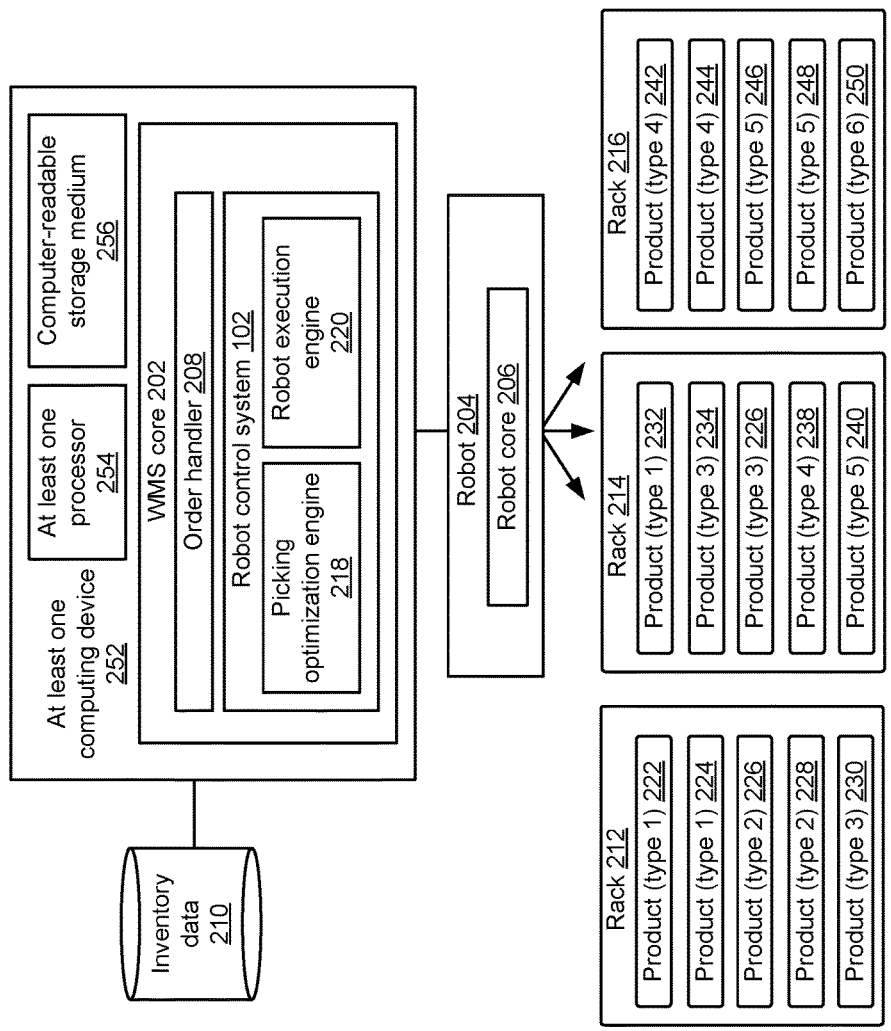
FIG. 2 is a block diagram of a more detailed example implementation of the system of FIG. 1.

FIG. 2 is a block diagram of a more detailed example implementation of the system of FIG. 1. In the example of FIG. 2, a warehouse management system (WMS) core 202 represents core computing functionalities of the WMS, which interacts with a robot 204 and its robot core 206. It is assumed that the WMS core 202 includes an order handler 208 that receives one or more customer orders, as well as inventory data 210 that stores information characterizing available inventory for sale.

The inventory data 210 may include location and quantity data specifying, for each inventory product type, current locations of corresponding inventory products (i.e., the one or more racks currently storing at least one products of a product type), as well as a number of such products currently available. Consequently, upon receipt of an order, the order handler 208 may search the inventory data 210 for the ordered products, and provide the ordered products and associated information to the robot control system 102 of FIGS. 1 and 2.

Thus, by way of example, and as shown in FIG. 2, the inventory data 210 may store information identifying racks 212, 214, and 216. Then, a picking optimization engine 218 may be configured to provide an identified, minimized number of the racks 212, 214, 216 to a robot execution engine 220, which may then provide the identified racks to the robot 204, and otherwise cause the robot 204 to move to the identified racks and transport the identified racks to a location for packaging and shipping.

In order to provide specific examples, the rack 212 is illustrated as including products 222, 224 of a first product type, products 226, 228 of a second product type, and product 230 of a third product type. Meanwhile, the rack 214 is illustrated as including product 232 of the first product type, products 234, 236 of the third product type, product 238 of a fourth product type, and product 240 of a fifth product type. The rack 216 is illustrated as including products 242, 244 of the fourth product type, products 246, 248 of a fifth product type, and product 250 of a sixth product type.

As may be observed, different orders may require different racks, and different numbers of racks. For example, an order containing products of type 1, 2, and 3 could be fulfilled by retrieving the single rack 212. An order containing products of types 2, 3, and 5 could be fulfilled by retrieving either a first set of racks 212, 214, or a second rack set 212, 216, 218. Of course, in practice, there may be hundreds or thousands of racks, each with a number of different products of varying product types. Consequently, for a given order, there may be a very large solution space of potential rack sets of varying sizes that each include all ordered products, with some of the solution rack sets being larger than others.

FIG. 2 illustrates that the WMS core 202, including the robot control system 102, may be implemented using at least one computing device, which may itself include at least one processor 254 and a non-transitory, computer-readable storage medium 256. That is, instructions stored on the computer-readable storage medium 256 may be executed by the at least one processor 254, in order to execute the WMS core 202.

Figure 3:
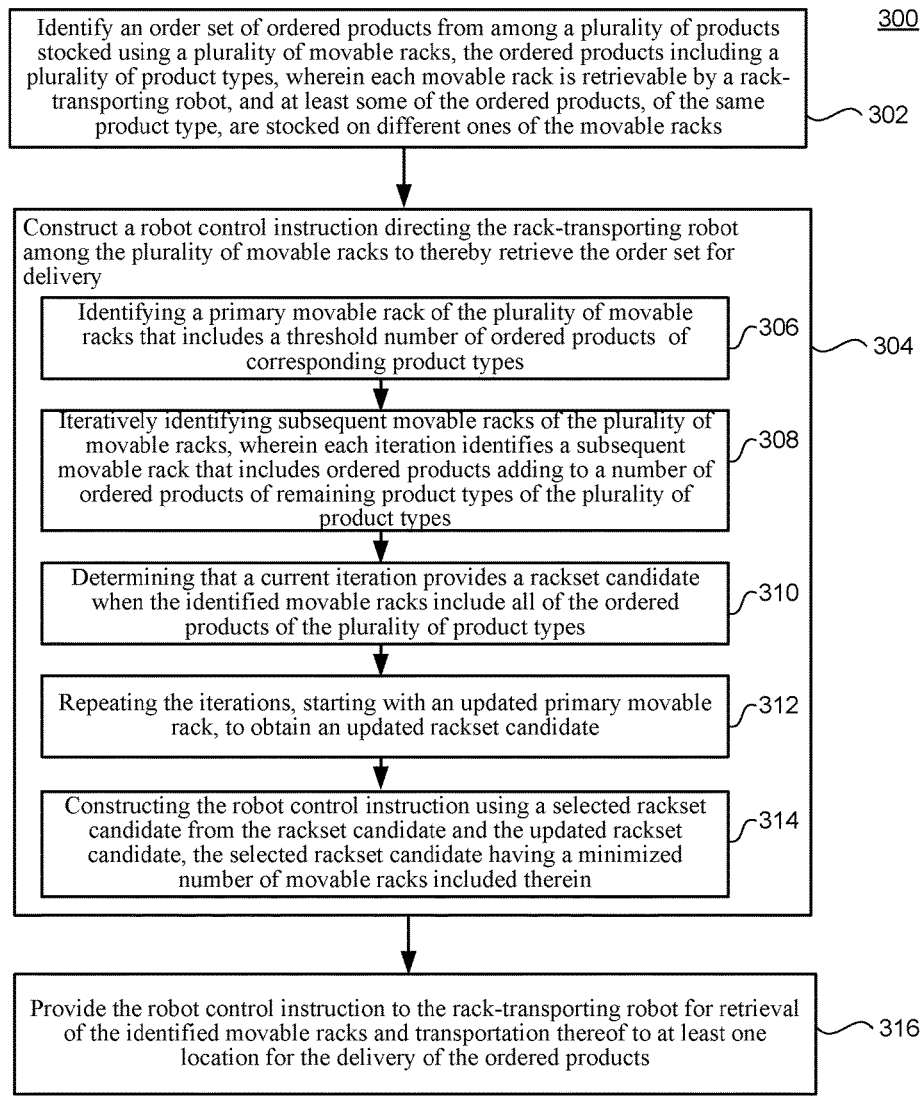
FIG. 3 is a flowchart illustrating example operations of the system of FIG. 1.

FIG. 3 is a flowchart illustrating example operations of the system of FIG. 1. In FIG. 3, operations are illustrated as sequential, but it will be appreciated that any two or more operations of FIG. 3 may be executed in a partially or completely overlapping or parallel manner, or in a nested, iterative, or branched fashion. Further, additional or alternative operations may be included, and/or one or more operations may be omitted.

In the example of FIG. 3, an order set of ordered products from among a plurality of products stocked using a plurality of movable racks may be identified, the ordered products including a plurality of product types, wherein each movable rack is retrievable by a rack-transporting robot, and at least some of the ordered products, of the same product type, are stocked on different ones of the movable racks (302). For example, with reference to FIG. 2, the picking optimization engine 218 of the robot control system 102 may be configured to receive ordered products by way of the order handler 208, and identified from within the inventory data 210. As shown in the simplified example of FIG. 2, the plurality of movable racks may include the racks 212, 214, 216, and the ordered products may include products ordered from the available products of product types 1-6 (222-250).

A robot control instruction directing the rack-transporting robot among the plurality of movable racks to thereby retrieve the order set for delivery may be constructed (304). For example, the robot control instruction may be constructed using a greedy algorithm to determine a local optimum solution in which a number of the racks 212, 214, 216 needed to complete the received order is minimized. As shown in FIG. 3, construction of the robot control instruction may include a number of sub-operations.

In particular, a primary movable rack of the plurality of movable racks that includes a threshold number of ordered products of corresponding product types may be identified (306). For example, as illustrated and described below with respect to FIG. 5, the picking optimization engine 218 may first identify and select a rack that include a maximum number of products of ordered product types. For example, if an order includes ten products of ten product types, and a first rack includes five of the ten, while no other rack includes more than four of the ten, then the first rack would be selected as the primary rack. Thus, the threshold number may represent a maximum number of products and/or product types, but as explained below, the threshold number need not always represent a maximum number (such as during later iterations when a second or third-highest number of products/product types may be used).

Subsequent movable racks of the plurality of movable racks may be iteratively identified, wherein each iteration identifies a subsequent movable rack that includes ordered products adding to a number of ordered products of remaining product types of the plurality of product types (308). For example, as illustrated and described below with respect to FIGS. 6 and 7, and continuing the example just given, the picking optimization engine 218 may identify one of the remaining racks as including an additional three products/product types beyond the five included in the primary rack, thereby identifying eight of the ten ordered products.

A current iteration may be determined to provide a rackset candidate when the identified movable racks include all of the ordered products of the plurality of product types (310). For example, as illustrated and described below with respect to FIG. 8, such a rackset candidate provides a suitable solution set of racks which may be used to fulfill the order in question, such as when a rack is identified as having the final two products/product types of the ten ordered products in the simplified example of the preceding paragraphs.

The iterations may be repeated, starting with an updated primary movable rack, to obtain an updated rackset candidate (312). For example, the picking optimization engine 218 may be configured to select a new primary movable rack, having the same or updated threshold number of ordered products of the corresponding product types. For example, if there is a second movable rack that also includes five of the ten ordered products/product types (e.g., a different set of five than in the original primary rack), then the second movable rack may be selected as the updated primary movable rack. In some implementations, the threshold number need not be the maximum number, but may be a maximum-available number of ordered products of corresponding product types, e.g., may be four products/product types of the ten ordered products, when no other rack includes five.

The robot control instruction may then be constructed using a selected rackset candidate from the rackset candidate and the updated rackset candidate, the selected rackset candidate having a minimized number of movable racks included therein (314). For example, the rackset having the smallest number of racks may be selected. In practice, thought, the minimized number need not represent a singular or absolute minimum, such as when a plurality of racksets having the minimized number of racks are available, and/or when a next-lowest number of racks is selected, e.g., for some external, separate, or additional reason (e.g., total travel distance for the robot 204). Although FIG. 3 provides a simplified example describing only two primary movable racks (and associated iterations to determine corresponding the rackset candidate and the updated rackset candidate), it will be appreciated that the picking optimization engine 218 may be configured to construct a plurality of rackset candidates. Thereby, the picking optimization engine 218 may be configured to increase the odds that a suitable rackset candidate will be identified, while still being able to suitable constrain computational costs and time required to do so.

The robot control instruction may be provided to the rack-transporting robot for retrieval of the identified movable racks and transportation thereof to at least one location for the delivery of the ordered products (316). For example, as shown in FIG. 2, the robot execution engine 220 may be configured to provide the robot control instruction to the robot core 206 of the robot 204, to thereby cause the robot 204 to move among, or otherwise interact with, the selected racks of the illustrated racks 212, 214, 216.

Figure 4:
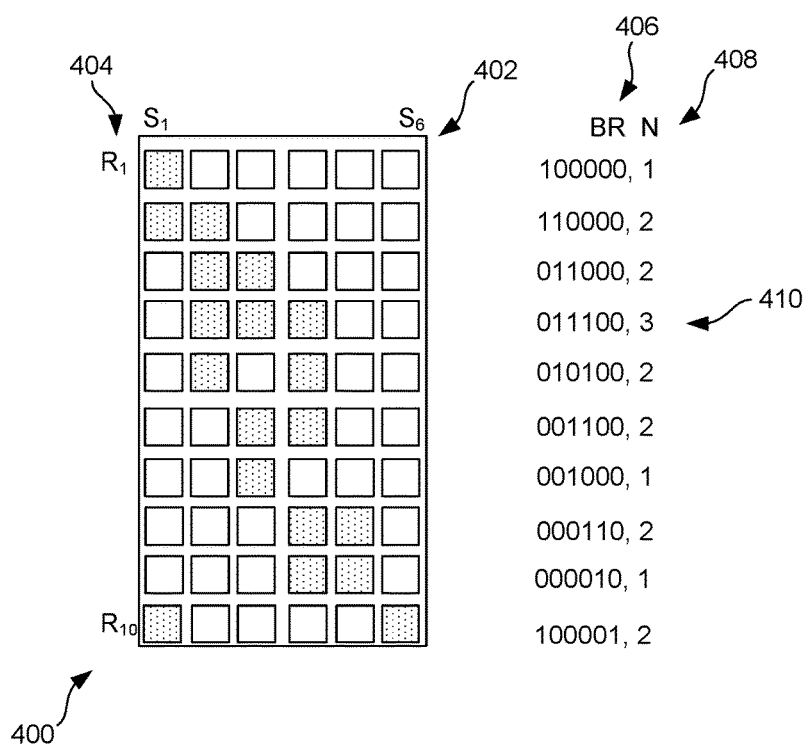
FIG. 4 is a block diagram of an example bitmap model used in the system of FIG. 1.

FIG. 4 is a block diagram of an example bitmap model 400 used in the system of FIG. 1. As illustrated and described below, the use of the bitmap model of FIG. 4 enables fast and efficient computation of the solution process of FIG. 3.

In particular, in FIG. 4, a number of products "S" within an ordered set of products 402 may be represented as $S_1$-$S_6$. A number of racks "R" within a set of racks 404 may be represented as $R_1$-$R_{10}$. A bit representation 406 for each rack may then be constructed, in which each BR for each rack R includes a number "N" 408 of products in each rack, so that the number of ordered products within each rack may be identified as $N_i$.

For example, in FIG. 4, BR 410 for $R_4$ is equal to three, because products $S_2$, $S_3$, and $S_4$ are included in BR 410 and the content of the rack $R_4$ is represented within BR 410 as a value "1" and in contrast with a value "0" for products $S_1$, $S_5$, and $S_6$ that are not included in BR 410, so that BR 410 is defined as: 011100.

Figure 5:
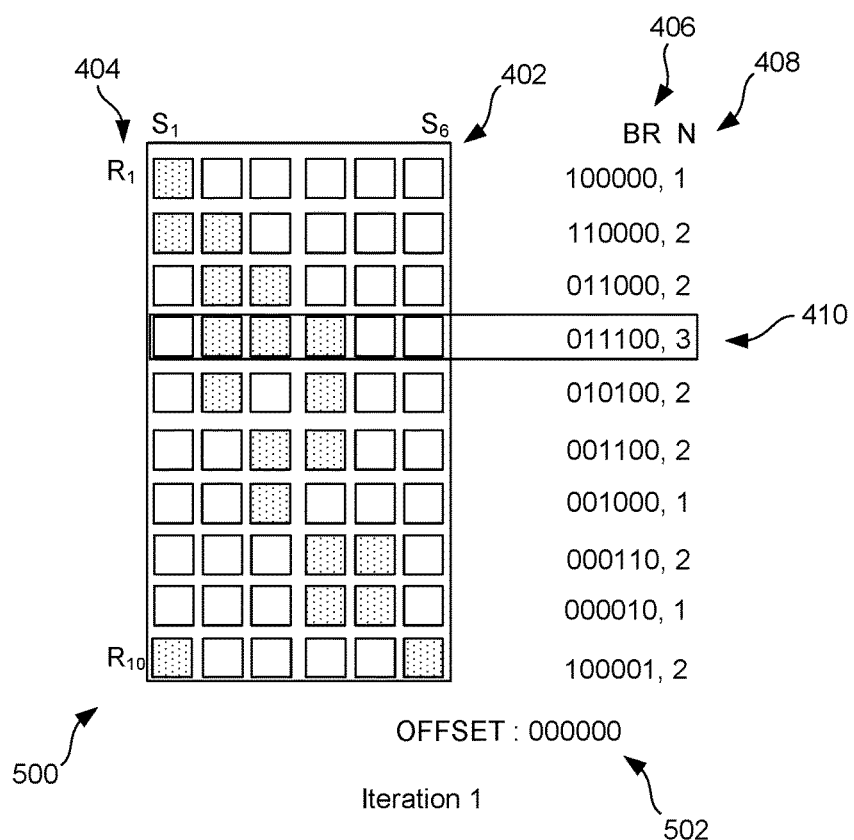
FIG. 5 is a block diagram of the example bitmap model of FIG. 4 being used during a first operation of the system of FIG. 1 to determine a solution set of racks.

In FIG. 5, the bitmap model 500 illustrates that the BR 410 is selected as the maximum value for available BR values "$N_i$". That is, the rack $R_4$ corresponding to the BR 410 is selected as the primary rack. FIG. 5 also illustrates an offset value 502, which, as explained in detail below, represents an extent to which a current iteration represents a rackset solution candidate.

For example, as shown in FIG. 5, the offset value 502 is initially 000000, prior to identification of the BR 410 as the primary rack. As also may be observed in FIG. 5, all of the value of $N_i$ corresponds to the number of products in the corresponding rack/row of the matrix 500, e.g., a rack-specific count of products. For example, N=2 for row $R_2$, because $S_1$ and $S_2$ are included. Similar comments apply to rows/racks $R_3$, $R_5$, $R_6$, $R_8$, and $R_{10}$, all with N=2 and corresponding to included products in each row/rack, and to rows/racks $R_1$, $R_7$, and $R_9$, all with N=1.

Figure 6:
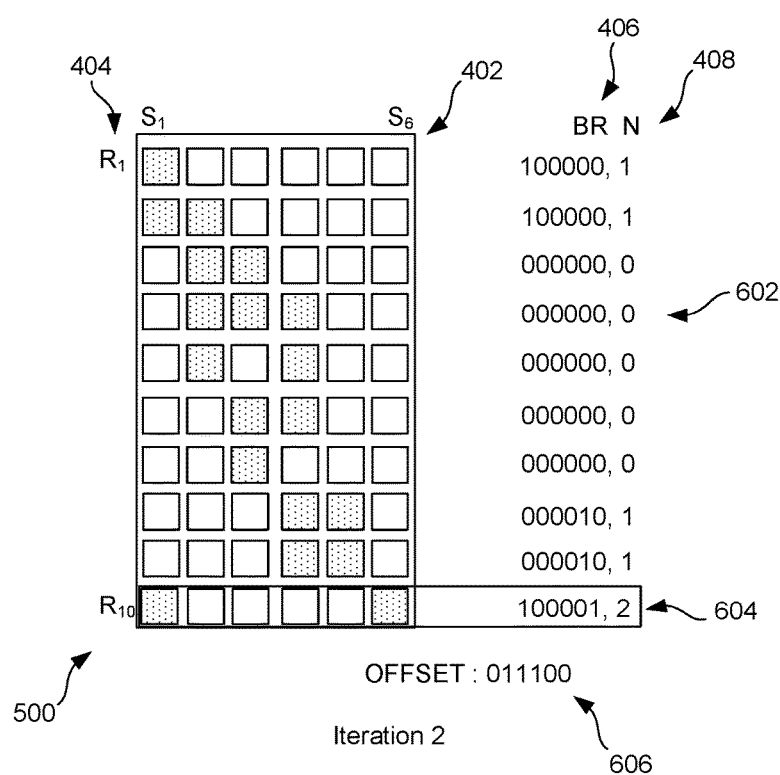
FIG. 6 is a block diagram of the example bitmap model of FIG. 4 being used during a second operation of the system of FIG. 1 to determine a solution set of racks.

Afterwards, as shown in FIG. 6, the BR value 602 for the primary rack $R_4$ is reset to a value of zero (000000), because all of products $S_2$, $S_3$, $S_4$ are included in an offset value 606. Similar adjustments are made, as needed, to all the remaining rows that include at least one of the values in the offset value. For example, the row/rack $R_2$ includes $S_2$, which is already included in the offset value 606. Consequently, the product $S_2$ will not add value to the rackset solution being constructed since it is already included in the rack $R_4$ that has already been selected, and so the value $N_2$ is reduced from N=2 to N=1. Similarly, the value of $N_3$ is reduced from N=2 to N=0, because both the products $S_2$ and $S_3$ in the row/rack $R_3$ are already included in the offset value 606.

Once similar adjustments are made to all the rows/racks, as needed, the values for $N_i$ may be observed in FIG. 6. As is apparent after these adjustments, a next-highest BR value may be selected, e.g., the BR value 604 for the rack $R_{10}$ with N=2, i.e., 100001.

Figure 7:
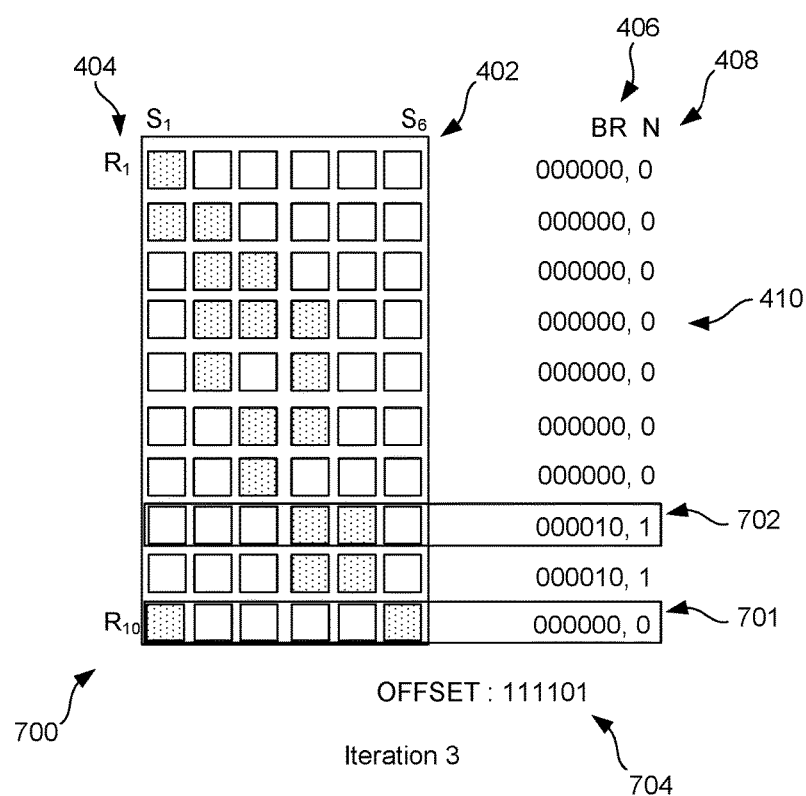
FIG. 7 is a block diagram of the example bitmap model of FIG. 4 being used during a third operation of the system of FIG. 1 to determine a solution set of racks.

In FIG. 7, the offset value 704 is updated to 111101 and the BR value 701 for the rack $R_{10}$, and associated value $N_{10}$, having been included in the offset value 704, is set to zero, i.e., $BR_{10}$=000000 and $N_{10}$=0. Remaining values of $N_i$ are reduced in the manner described with respect to FIG. 6, leaving only $N_8$ and $N_9$ equal to a value of one, as shown. Then, in this iteration, the BR 702 (i.e., $BR_8$=000010) and associated value $N_8$=1 for rack $R_8$ is selected as a next-available maximum value of N. As shown, $R_9$ also includes a value N=1, but in the example, the value of $N_8$ is preferentially selected simply as being identified first and before the value of $N_9$ is reached.

Figure 8:
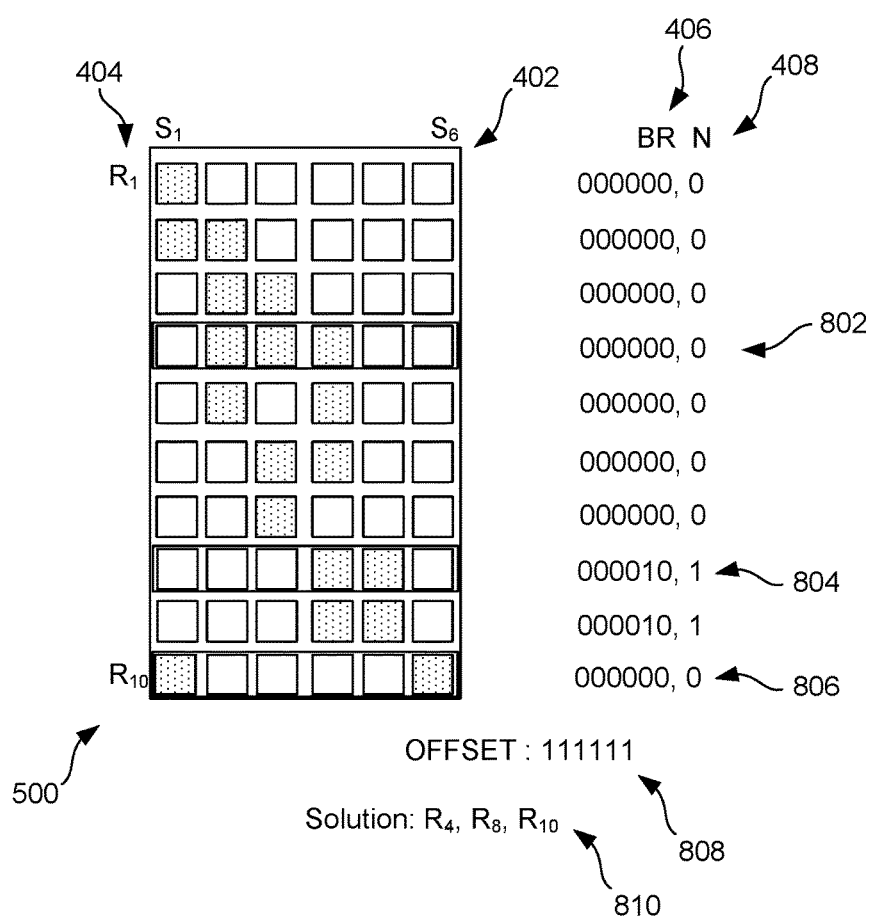
FIG. 8 is a block diagram of the example bitmap model of FIG. 4 being used during a fourth operation of the system of FIG. 1 to determine a solution set of racks.

Consequently, in FIG. 8, the offset value 808 is equal to 111111, so that racks 802, 804, 806 correspond to a rackset solution candidate $R_4$, $R_8$, and $R_{10}$, in which all ordered products of the ordered product types are included.

As referenced above with respect to FIG. 3, and described in more detail below with respect to FIG. 10, the iterations of FIGS. 5-8 may then be repeated, e.g., using a new primary rack. In this way, a number of potential rackset solutions may be identified, and a rackset having a minimized number of racks included therein may be selected for use in providing the robot control instruction.

Figure 9:
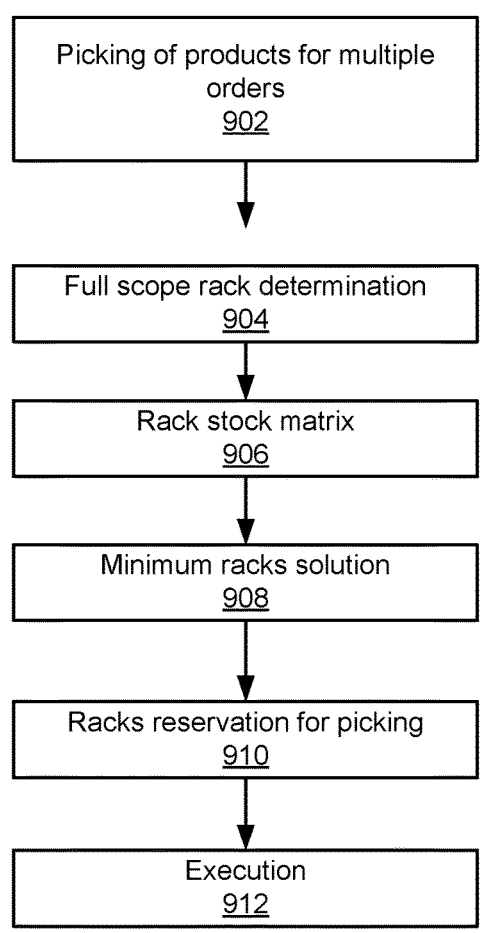
FIG. 9 is a flowchart illustrating a software control process for the system of FIG. 1.

FIG. 9 is a flowchart 900 illustrating a software control process for the system of FIG. 1. In FIG. 9, products for multiple orders are identified from within the multiple orders received (902). For example, multiple orders may be grouped using various criteria, such as temporal proximity of when the orders were received, geographical proximity of delivery destinations of the orders, similarly of products within multiple orders, number of products per order or per group of orders, and/or other criteria.

Once the ordered products are identified, the WMS core 202 may proceed to identify, from the inventory data 210, all racks storing all instances of the ordered products (904). Once identified, the picking optimization engine 218 may proceed to construct a rack stock matrix (906), such as those illustrated and described above with respect to FIGS. 4-8. Using the rack stock matrix, the techniques described above with respect to FIGS. 5-8 may be implemented to iteratively identify a minimized number of racks needed to fulfill the orders in question (908).

In the implementation of FIG. 9, it may be necessary to reserve the identified racks within the selected rackset for order picking (910), since other orders and other robots may also require access to at least some of the same racks. Finally in FIG. 9, execution of transporting the identified racks by the identified robot may occur (912).

Figure 10:
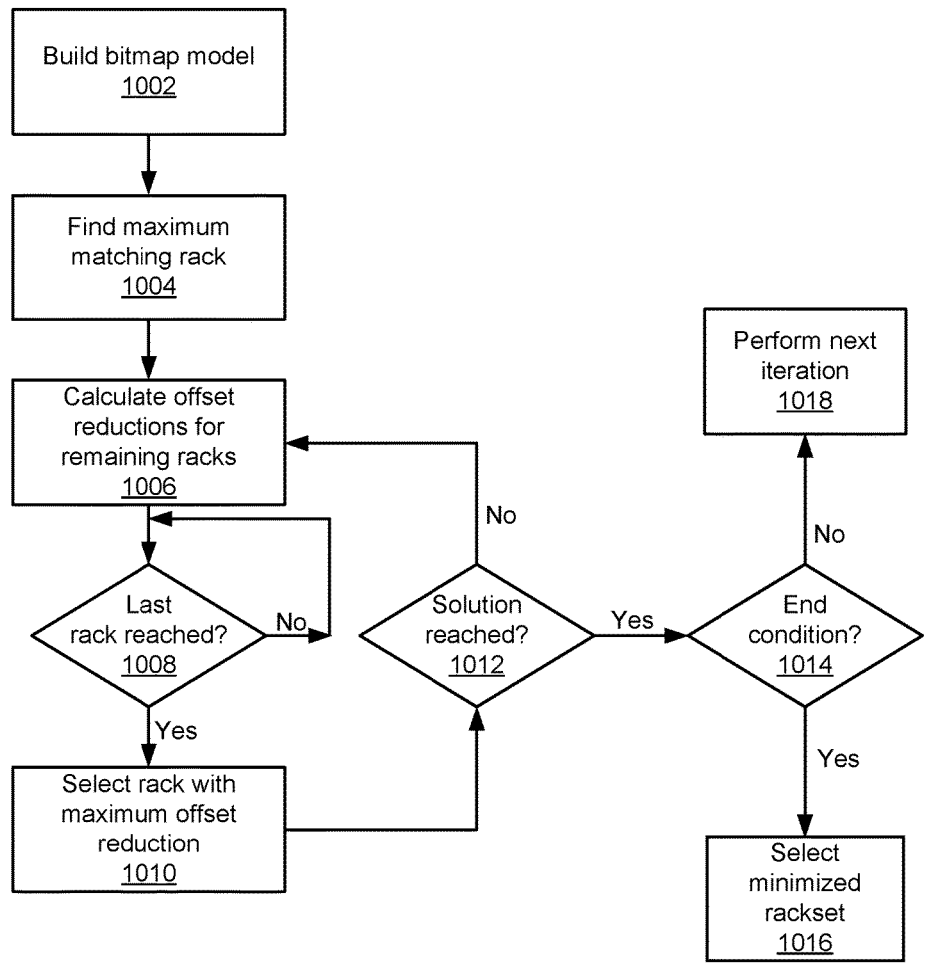
FIG. 10 is a flowchart illustrating an example implementation of the algorithm used in the examples of FIGS. 4-8.

FIG. 10 is a flowchart illustrating an example implementation of the algorithm used in the examples of FIGS. 4-8, and referenced in operation 906 of FIG. 9. In FIG. 10, a bit map model is built, such as that shown in FIG. 4 (1002). A maximum matching rack is identified (1004), as shown in FIG. 5. It may occur that multiple racks have the same maximum number, although the products/product types in the multiple maximum matching racks may be different. In such cases, the first identified maximum matching rack may be selected, or some other criteria may be used to differentiate the available choices of maximum matching racks.

The offset reductions for remaining racks, resulting from the selection of the maximum matching rack, may then be calculated (1006), as shown in FIG. 6, for use in selecting the next rack of the rackset solution candidate being constructed. That is, the bit map is updated such that products overlapping with products already included within the maximum matching rack are not counted. In other words, the count of products within each row/rack only includes products that, if that row/rack were selected, would add to the offset value and contribute to advancing toward a rackset solution candidate.

Afterwards, the remaining rows/racks may be traversed (1008), and once the last row/rack is reached, the rack that will provide the maximum offset reduction (e.g., row/rack $R_{10}$ in FIGS. 6/7, with $N_{10}=2$) may be selected (1010). If a rackset solution candidate has not been reached (e.g., the offset value still includes any values equal to zero, such as in the offset value 704) (1012), then the product counts $N_i$ may be re-calculated for the current offset value (1006), so that the best-available rack may again be selected (1008, 1010). These iterations may continue until a rackset solution candidate is reached (1012).

Once reached, an end condition may be considered (1014). For example, an end condition may specify a certain number of iterations, a certain quantity of time spent iterating, an acceptably-minimized rack count, a lack of any remaining racks that meet a threshold needed to be considered a primary rack selected (e.g., in operation 1004), or some other criteria. If the end condition is reached (1014), then all of the generated racksets are considered, and a minimized rackset may be selected.

Otherwise (1014), the process may continue with a subsequent iteration (1018). As shown and described, a new maximum matching rack may be selected (1004), different from the previous maximum matching rack. The operations 1006-1014, 1018 may be repeated, until an end condition is reached and the minimized rackset solution is reached (1016).

Various optimizations and variations also may be used. For example, when performing second and later iterations, it may occur that a current, incomplete rackset solution being constructed may already include a same or larger number of racks than an existing solution, already found in previous iterations. In such cases, no further benefit may be possible in completing a solution for the current rackset, since the current rackset being constructed will include the same or greater number of racks than in at least one existing solution. Consequently, in such scenarios, the process may immediately advance to checking the end condition(s) to determine whether to proceed with the best-available (e.g., smallest) rackset, or continue iterations with a newly-selected maximum matching rack.

Figure 11:
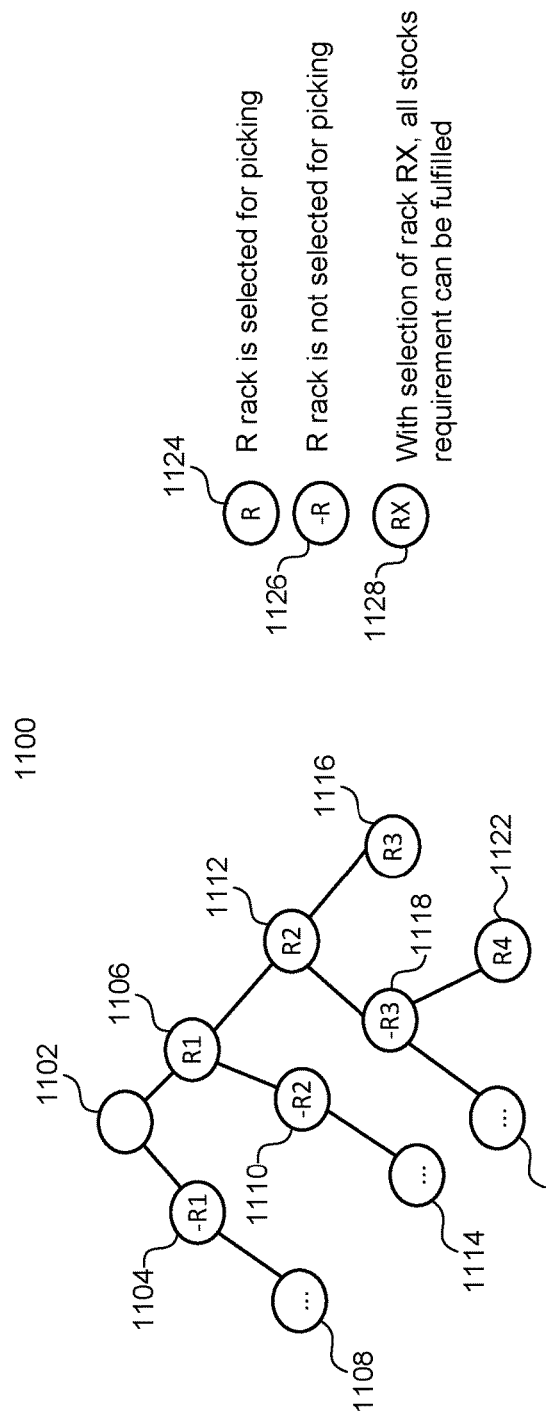
FIG. 11 is a block diagram of a binary tree used in determining a global optimum solution for the system of FIG. 1.

FIG. 11 is a block diagram of a binary tree used in determining a global optimum solution for the system of FIG. 1. In FIG. 11, the racks are represented using a binary tree 1100. As shown, the binary tree includes nodes 1102-1122. As illustrated in the included legend, a designation "—R" 1124 indicates selection of that rack, while a designation "—R" 1126 indicates non-selection. A designation "Rx" indicates a potential solution rackset has been reached.

To use the binary tree 1100 of FIG. 11, the binary tree 1100 can be traversed. For each node/rack, if the subsequent rack can add a product to the order(s) being considered, then traversal continues to the right ("R"). If the subsequent rack can not add a product to the order(s) being considered (e.g., is a repeated product, or a non-included product), then traversal continues to the left ("—R").

Traversal continues until a solution rackset is constructed. Then, the process may continue with constructed another solution rackset. As referenced above, if a current solution being constructed already grows in size to match or exceed a best-available solution, then the current solution may be immediately discarded. Otherwise, the process continues with returning up the binary tree to a next-available starting node/rack, and thereafter recommencing the same traversal process.

Advantageously, FIG. 11 provides a global optimum solution for a minimized rackset. However, as described, it may be impractical or infeasible to utilize this approach, particularly when a large number of racks and/or products need to be considered. Nonetheless, the approach of FIG. 11 may be useful as an ancillary approach to the approach(es) of FIGS. 1-10, such as when a number of racks/products is relatively small, and/or if the techniques of FIGS. 1-10 do not yield an acceptable solution rackset.

The following description provides pseudocode as example techniques for implementing the above-described techniques of FIGS. 1-11. In the following description, SKU (Stock Keep Unit) is used to refer to products, and, for a set of customer orders, the list of SKUs for picking is represented as: $S_1, S_2 \ldots S_n$. The variable R is used below to represent the racks in the warehouse. Thus, a list of racks for storage of products is represented as: $R_1, R_2 \ldots R_m$.

Using the above notation, the following pseudocode takes a list of SKUs for picking as input: $S_1, S_2 \ldots S_n$, where $S_1$ is stored in a set of Racks: $RSet_1$, $S_2$ is stored in a set of Racks: $RSet_2$, and $S_n$ is stored in a set of Racks: $RSet_n$. The racksets $RSet_1, RSet_2 \ldots RSet_n$ contain a subset of racks, $R_1$, $R_2 \ldots R_m$. Then, the resulting output includes rackset candidates, from which a selected rackset candidate is chosen as having a minimized number of racks to be used to provide a robot control instruction for order picking. That is, the output includes a list of racks: $RR_1, RR_2 \ldots R_i$, where $S_1, S_2 \ldots S_n$ can be picked from AT LEAST one of these racks, and i is a minimum one.

Pseudocode 1 uses the above notation to illustrate the use of the global optimum solution of FIG. 11:

---
Pseudocode 1

FUNCTION: FIND _SOLUTION_CANDIDATE ($R_i$, RR, SS):
If i > m. // the last node reached
Return;
If Stock of $R_i$ contains any SKU not in SS. //right child $R_i$
    RR_NEW = RR + $R_i$; //$R_i$ is collected into solution candidate.
    SS_NEW = SS U $S_i$;
If SS_NEW contains all the SKUs.
        Append RR_NEW to RRs; //Solution candidate.
        FIND _SOLUTION_CANDIDATE ($R_{i+1}$, RR, SS); //
        $R_i$ is NOT
collected
    Else.
        FIND _SOLUTION_CANDIDATE ($R_{i+j}$,
        RR_NEW, SS_NEW);
//right child $R_{i+j}$
    Endif.
Endif.
FIND _SOLUTION_CANDIDATE ($R_{i+1}$, RR, SS); //
$R_i$ is NOT collected

---

In this way, the RR having a minimum length may be selected from the generated list of RRs. As referenced above, this type of algorithm may be improved by recording a current optimal solution, using RR_BEST as shown below in Pseudocode 2, and then stopping deep travelling down the binary tree once the current solution matches or exceeds the current RR_BEST solution.

Pseudocode 2

```
FUNCTION: FIND_SOLUTION_CANDIDATE (R_i, RR, SS):
    If i > m. // the last node reached
        Return;
    If Stock of R_i contains any SKU not in SS. //right child R_i
        RR_NEW = RR U R_i; //R_i is collected into solution candidate.
        SS_NEW = SS U S_i;
        If SS_NEW contains all the SKUs.
            If RR_NEW.size < minimum_size or minimum_size = 0.
                minimum_size = RR_NEW.size;
                RR_BEST = RR_NEW;
            Endif.
            FIND_SOLUTION_CANDIDATE (R_{i+1}, RR, SS); //
            R_i is NOT
collected
        Else.
            If RR_NEW.size = minimum_size - 1.
                FIND_SOLUTION_CANDIDATE (R_{i+1}, RR, SS); //
                R_i is
NOT collected
            Endif
            FIND_SOLUTION_CANDIDATE (R_{i+j}, RR, SS) //right
                child R_{i+j}
        Endif.
    Endif.
    FIND_SOLUTION_CANDIDATE (R_{i+1}, RR, SS); //
    R_i is NOT collected
```

In order to implement the algorithm(s) of FIGS. 1-10, the following notation is used in Pseudocode 3, with particular reference to the bit maps of FIGS. 4-8. Specifically, $BR_i$ is the bit value of $R_i$, BSS is the bit value of SS, and BSS_NEW is the bit value of SS_NEW. Thus, for example, a calculation of whether the stock/products of $R_1$ contains an SKU not in SS may be determined as: Result=$BR_i$ AND BSS; if Result>0: Yes; Otherwise: No. A calculation of SS_NEW may be performed as SS_NEW=SS U $S_i$, with BSS_NEW=BSS OR $BS_i$. A calculation of whether SS_NEW contains all the SKUs may be expressed as BSS_NEW=1111111111 (for n=10).

Using the above notation, Pseudocode 3 may be used as an example technique involving making a locally optimal choice at each stage/iteration, in order to find a solution quickly that is likely to approximate a globally optimum solution.

Pseudocode 3

```
Function: FIND_LOCAL_OPT_SOLUTION (STOCK_RACK[ ][ ])
//Step 1: build up the bitmap model and find the maximum matching rack.
loop ( i = 0, I < R.size, i++).
    loop ( j = 0, j < S.size, j++).
        BR[i] << ;
        If STOCK_RACK[i][j] has stock match
            BR[i] + +;
        Endif.
    Endloop.
Endloop.
FIND_RACKS (BR, OFFSET) ;
Function: FIND_RACKS (BR, OFFSET)
//Step 2: refine the left stock
loop ( i = 0, I < R.size, i++).
    BR[i] = BR[i] AND (NOT OFFSET);
    BV = BR[i];
    While (BV < > 0 ). //calculate the number of 1 in the BR[i]
        N[i] = N[i] + BV AND 1;
        BV = BR[i] >>.
    Endloop.
    If N[i] > N[max];
        max = i;
    Endif.
Endloop.
Append max to Result;
```

-continued

Pseudocode 3

```
OFFSET = OFFSET OR BR[i];
If OFFSET = 11111111;
    Return; //solution reached
Endif.
//Step 3: recursively find the next local optimal solution in submatrix
FIND_RACKS (BR, OFFSET);
```

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
    identify an order set of ordered products from among a plurality of products stocked using a plurality of movable racks, the ordered products including a plurality of product types, wherein each movable rack is retrievable by a rack-transporting robot, and at least some of the ordered products, of the same product type, are stocked on different ones of the movable racks;
    construct a robot control instruction directing the rack-transporting robot among the plurality of movable racks to thereby retrieve the order set for delivery, including
        identifying a primary movable rack of the plurality of movable racks that includes a threshold number of ordered products of corresponding product types,
        iteratively identifying subsequent movable racks of the plurality of movable racks, wherein each iteration identifies a subsequent movable rack that includes ordered products adding to a number of ordered products of remaining product types of the plurality of product types,
        determining that a current iteration provides a rackset candidate when the identified movable racks include all of the ordered products of the plurality of product types,
        identifying an updated primary movable rack of the plurality of movable racks that is different from the primary movable rack,
        iteratively identifying subsequent, updated movable racks of the plurality of movable racks, wherein each iteration identifies a subsequent, updated movable rack that includes ordered products adding to an updated number of ordered products of remaining product types of the plurality of product types,
        determining that an updated current iteration provides an updated rackset candidate when the identified updated movable racks include all of the ordered products of the plurality of product types,
        constructing the robot control instruction using a selected rackset candidate from the rackset candidate and the updated rackset candidate, the selected rackset candidate having a minimized number of movable racks included therein; and
    provide the robot control instruction to the rack-transporting robot for retrieval of the identified movable racks and transportation thereof to at least one location for the delivery of the ordered products.

2. The computer program product of claim 1, wherein the instructions, when executed, are further configured to:
    identify the primary movable rack as a maximum matching rack in which the threshold number represents a maximum available number of the ordered products stored using any of the plurality of movable racks.

3. The computer program product of claim 1, wherein the instructions, when executed, are further configured to:
    iteratively identify the subsequent movable racks of the plurality of movable racks by, at each iteration, and identifying the subsequent movable rack for the current iteration as having a maximum number of ordered products that have not yet been identified within at least one movable rack during at least one previous iteration.

4. The computer program product of claim 1, wherein the instructions, when executed, are further configured to:
    identify the updated primary movable rack as a maximum matching rack including a maximum available number of the ordered products stored using any of the plurality of movable racks, other than the primary movable rack.

5. The computer program product of claim 1, wherein the instructions, when executed, are further configured to:
    construct the robot control instruction including
        constructing a bitmap model as a matrix including the plurality of moveable racks and the ordered products on perpendicular axes; and
        representing ordered products stored using each rack of the plurality of moveable racks by constructing a bit representation including, for each rack, a bit value of one when a corresponding ordered product is included, and a bit value of zero when a corresponding ordered product is not included.

6. The computer program product of claim 5, wherein the instructions, when executed, are further configured to:
    identify the primary movable rack as a maximum matching rack having a corresponding bit representation with a largest-available number of bits set equal to one.

7. The computer program product of claim 6, wherein the bitmap model includes a rack-specific count of ordered products for each rack, equal to a number of bit values set equal to one, and wherein the instructions, when executed, are further configured to:
    iteratively identify subsequent movable racks of the plurality of movable racks, including
        constructing, at each iteration, a bit representation of an offset value in which all ordered products included from at least one preceding iteration are represented using a bit value equal to one, and
        updating the bitmap model including reducing the rack-specific count of ordered products for each rack that includes an ordered product included in the offset value.

8. The computer program product of claim 7, wherein the instructions, when executed, are further configured to:
    iteratively identify subsequent movable racks of the plurality of movable racks, including performing rack selection based on a highest-available rack-specific count of ordered products, following the reducing of the rack-specific count of ordered products.

9. The computer program product of claim 7, wherein the instructions, when executed, are further configured to:
determine that the current iteration provides the rackset candidate when the identified movable racks include all of the ordered products of the plurality of product types, as represented by the offset value having all bits set equal to one.

10. A computer-implemented method, comprising:
identifying an order set of ordered products from among a plurality of products stocked using a plurality of movable racks, the ordered products including a plurality of product types, wherein each movable rack is retrievable by a rack-transporting robot, and at least some of the ordered products, of the same product type, are stocked on different ones of the movable racks;
constructing a robot control instruction directing the rack-transporting robot among the plurality of movable racks to thereby retrieve the order set for delivery, including
identifying a primary movable rack of the plurality of movable racks that includes a threshold number of ordered products of corresponding product types,
iteratively identifying subsequent movable racks of the plurality of movable racks, wherein each iteration identifies a subsequent movable rack that includes ordered products adding to a number of ordered products of remaining product types of the plurality of product types,
determining that a current iteration provides a rackset candidate when the identified movable racks include all of the ordered products of the plurality of product types,
identifying an updated primary movable rack of the plurality of movable racks that is different from the primary movable rack,
iteratively identifying subsequent, updated movable racks of the plurality of movable racks, wherein each iteration identifies a subsequent, updated movable rack that includes ordered products adding to an updated number of ordered products of remaining product types of the plurality of product types,
determining that an updated current iteration provides an updated rackset candidate when the identified updated movable racks include all of the ordered products of the plurality of product types,
constructing the robot control instruction using a selected rackset candidate from the rackset candidate and the updated rackset candidate, the selected rackset candidate having a minimized number of movable racks included therein; and
providing the robot control instruction to the rack-transporting robot for retrieval of the identified movable racks and transportation thereof to at least one location for the delivery of the ordered products.

11. The computer-implemented method of claim 10, wherein the identifying the primary movable rack comprises:
identifying a maximum matching rack in which the threshold number represents a maximum available number of the ordered products stored using any of the plurality of movable racks.

12. The computer-implemented method of claim 10, wherein the iteratively identifying the subsequent movable racks of the plurality of movable racks comprises, at each iteration:
identifying the subsequent movable rack for the current iteration as having a maximum number of ordered products that have not yet been identified within at least one movable rack during at least one previous iteration.

13. The computer-implemented method of claim 10, further comprising:
identifying the updated primary movable rack as a maximum matching rack including a maximum available number of the ordered products stored using any of the plurality of movable racks, other than the primary movable rack.

14. The computer-implemented method of claim 10, wherein constructing the robot control instruction includes:
constructing a bitmap model as a matrix including the plurality of moveable racks and the ordered products on perpendicular axes; and
representing ordered products stored using each rack of the plurality of moveable racks by constructing a bit representation including, for each rack, a bit value of one when a corresponding ordered product is included, and a bit value of zero when a corresponding ordered product is not included.

15. The computer-implemented method of claim 14, further comprising:
identifying the primary movable rack as a maximum matching rack having a corresponding bit representation with a largest-available number of bits set equal to one.

16. The computer-implemented method of claim 15, wherein the bitmap model includes a rack-specific count of ordered products for each rack, equal to a number of bit values set equal to one, and further comprising:
iteratively identifying subsequent movable racks of the plurality of movable racks, including
constructing, at each iteration, a bit representation of an offset value in which all ordered products included from at least one preceding iteration are represented using a bit value equal to one, and
updating the bitmap model including reducing the rack-specific count of ordered products for each rack that includes an ordered product included in the offset value.

17. The computer-implemented method of claim 16, wherein the iteratively identifying subsequent movable racks of the plurality of movable racks further comprises:
performing rack selection based on a highest-available rack-specific count of ordered products, following the reducing of the rack-specific count of ordered products.

18. The computer-implemented method of claim 17, further comprising:
determining that the current iteration provides the rackset candidate when the identified movable racks include all of the ordered products of the plurality of product types, as represented by the offset value having all bits set equal to one.

19. A computer program product, the computer program product being tangibly embodied on a non-transitory computer-readable storage medium and comprising instructions that, when executed, are configured to cause at least one computing device to:
receive at least one order for ordered products;
access an inventory database to determine storage locations of each of the ordered products on corresponding movable racks of a plurality of movable racks within a warehouse, wherein the corresponding movable racks store mixed product types and at least some of the ordered products are stored using multiple racks of the corresponding movable racks;

construct a bitmap model as a matrix including the corresponding movable racks and the ordered products on perpendicular axes;

represent ordered products stored using each rack of the corresponding movable racks by constructing a bit representation including, for each rack of the corresponding movable racks, a bit value of one when a corresponding ordered product is included, and a bit value of zero when a corresponding ordered product is not included;

storing product counts of ordered products in each corresponding movable rack, the product counts being set equal to a number of ones in the bit representations of the corresponding movable racks;

selecting a maximum matching rack of the corresponding movable racks, the maximum matching rack having a highest-available number of ones included in its corresponding bit representation;

reducing the product counts to reflect removal, for each corresponding movable rack, of each ordered product already included in the preceding maximum matching rack;

iteratively selecting a current maximum matching rack and reducing the product counts, until a rackset of all of the maximum matching racks includes all of the ordered products; and providing a robot control instruction to a rack-transporting robot to retrieve the movable racks within the rackset, for packaging and delivery of the ordered products retrieved therefrom.

20. The computer program product of claim 19, wherein the instructions, when executed, are further configured to:

identify an updated rackset, including resetting the bitmap model and product counts to an original state;

selecting an updated maximum matching rack that is different from the maximum matching rack;

reducing the re-set product counts to reflect removal, for each corresponding movable rack, of each ordered product already included in the preceding, updated maximum matching rack;

iteratively selecting a current, updated maximum matching rack and reducing the re-set product counts, until an updated rackset of all of the updated maximum matching racks includes all of the ordered products; and selecting between the rackset and the updated rackset, based on which rackset includes fewer racks; and providing a robot control instruction to a rack-transporting robot to retrieve the movable racks within the selected rackset.

* * * * *